(12) United States Patent
Maki et al.

(10) Patent No.: US 10,135,998 B2
(45) Date of Patent: Nov. 20, 2018

(54) KEY TELEPHONE SYSTEM, CONTROL METHOD, TERMINAL, AND PROGRAM

(71) Applicants: NEC PLATFORMS, LTD., Kawasaki-shi, Kanagawa (JP); NIPPON TELEGRAPH AND TELEPHONE EAST CORPORATION, Tokyo (JP); NIPPON TELEGRAPH AND TELEPHONE WEST CORPORATION, Osaka-shi, Osaka (JP)

(72) Inventors: Hideo Maki, Kawasaki (JP); Norio Murakami, Osaka (JP); Shozo Shikenya, Osaka (JP); Tetsuya Takekawa, Osaka (JP); Daisuke Iwata, Tokyo (JP)

(73) Assignees: NEC Platforms, Ltd., Kawasaki-shi, Kanagawa (JP); NIPPON TELEGRAPH AND TELEPHONE EAST CORPORATION, Shinjuku, Tokyo (JP); NIPPON TELEGRAPH AND TELEPHONE WEST CORPORATION, Osaka-shi, Osaka (JP)

( * ) Notice: Subject to any disclaimer, the term of this patent is extended or adjusted under 35 U.S.C. 154(b) by 47 days.

(21) Appl. No.: 14/787,610

(22) PCT Filed: Apr. 30, 2014

(86) PCT No.: PCT/JP2014/061969
§ 371 (c)(1),
(2) Date: Oct. 28, 2015

(87) PCT Pub. No.: WO2014/178397
PCT Pub. Date: Nov. 6, 2014

(65) Prior Publication Data
US 2016/0080580 A1 Mar. 17, 2016

(30) Foreign Application Priority Data

Apr. 30, 2013 (JP) ................................. 2013-095212

(51) Int. Cl.
*G06F 1/32* (2006.01)
*H04M 19/00* (2006.01)
(Continued)

(52) U.S. Cl.
CPC ............. *H04M 19/00* (2013.01); *H04M 3/28* (2013.01); *H04M 7/006* (2013.01);
(Continued)

(58) Field of Classification Search
CPC ......... H04W 52/0209; H04W 52/0274; H04W 52/028; G06F 1/32; G06F 1/3203; G06F 1/3206; G06F 1/3209
See application file for complete search history.

(56) References Cited

U.S. PATENT DOCUMENTS

2010/0115084 A1\* 5/2010 Caspi .................... G06F 1/3203
709/224
2010/0309904 A1\* 12/2010 Couse ................. H04M 1/2535
370/352

(Continued)

FOREIGN PATENT DOCUMENTS

EP 1302840 A2 4/2003
JP H04-445036 B2 7/1992
(Continued)

OTHER PUBLICATIONS

Japanese Office Action dated Jun. 4, 2013 in Japanese Patent Application No. 2013-095212.
(Continued)

*Primary Examiner* — Scott M Sciacca
(74) *Attorney, Agent, or Firm* — Sughrue Mion, PLLC

(57) ABSTRACT

A key telephone system includes a terminal and a primary device. The primary device transmits a command for tran-
(Continued)

sition into a power-saving state to the terminal, together with a power-saving duration time datum and/or a power-saving deactivating time datum, when the time reaches a power-saving state transition time. The terminal specifies the power-saving duration time and/or the power-saving deactivating time in the timekeeper means, and halts the communication means for communicating with the primary device at the time of receiving the command for transition into the power-saving state from the primary device, and activates the communication means being halted at a time when the timekeeper means has measured the lapse of the power-saving duration time and/or the power-saving deactivating time.

5 Claims, 4 Drawing Sheets

(51) Int. Cl.
    *H04W 52/02*      (2009.01)
    *H04M 3/28*      (2006.01)
    *H04M 7/00*      (2006.01)

(52) U.S. Cl.
    CPC ....... *H04W 52/027* (2013.01); *H04W 52/028* (2013.01); *H04W 52/0267* (2013.01); *H04Q 2213/1308* (2013.01); *H04Q 2213/13096* (2013.01); *Y02D 70/00* (2018.01); *Y02D 70/23* (2018.01)

(56) References Cited

U.S. PATENT DOCUMENTS

2011/0188496 A1    8/2011    Schaade et al.
2011/0320833 A1*  12/2011  R. ............................ H04L 12/12
                                            713/310
2012/0120306 A1*  5/2012  Schindler .................. H02J 1/14
                                            348/372
2012/0128357 A1*  5/2012  Mukai .................. H04B 10/272
                                            398/58
2013/0132745 A1*  5/2013  Schoening ............ G06F 1/3209
                                            713/310
2013/0227306 A1*  8/2013  Santos .................... H04L 49/40
                                            713/300

FOREIGN PATENT DOCUMENTS

| | | |
|---|---|---|
| JP | 2000-287240 A | 10/2000 |
| JP | 2005-101921 A | 5/2005 |
| JP | 2005-151332 A | 6/2005 |
| JP | 2005-277694 A | 10/2005 |
| JP | 2006-203698 A | 8/2006 |
| JP | 2007-173923 A | 7/2007 |
| JP | 2008-252282 A | 10/2008 |
| JP | 2009-218880 A | 9/2009 |
| JP | 2011-124768 A | 6/2011 |
| JP | 2011-155604 A | 8/2011 |
| JP | 2012-158078 A | 8/2012 |
| JP | 2013-030954 A | 2/2013 |
| WO | 2011-129086 A1 | 10/2011 |

OTHER PUBLICATIONS

EP Search Report dated Nov. 22, 2016 in EP Application No. 14791629.0.
International Search Report of PCT/JP2014/061969 dated Jul. 22, 2014 [PCT/ISA/210].

* cited by examiner

KEY TELEPHONE SYSTEM, CONTROL METHOD, TERMINAL, AND PROGRAM

CROSS REFERENCE TO RELATED APPLICATIONS

This is a U.S. national stage of application No. PCT/JP2014/061969, filed on Apr. 30, 2014. Priority under 35 U.S.C.§ 119(a) and 35 U.S.C.§ 365(b) is claimed from Japanese Patent Application No. 2013-095212 filed on Apr. 30, 2013, the disclosure of which is also incorporated herein by reference.

TECHNICAL FIELd

The present invention relates to a key telephone system, a control method, a terminal, and a computer program.

BACKGROUND ART

A method, in which a Liquid Crystal Display (LCD) is turned off, is applied in order to effectively reduce power consumption of a telephone set.

For example, sometimes a control unit of a network management server is provided with an operation mode schedule table for an IP (Internet Protocol) telephone set, and monitors time; in order to issue a command for changing an operation mode at a period of time specified in the table (for example, refer to PTL 1).

CITATION LIST

Patent Literature

{PTL 1} JP 2005-277694 A

SUMMARY OF INVENTION

Technical Problem

In the case of an IP telephone set, it is possible to stop network communication for further effectively reducing power consumption. Then, if the IP telephone set stops network communication, unfortunately a message coming from a primary device does not reach the IP telephone set, so that it is impossible to activate or resume a state of curbed power consumption according to a schedule of the primary device.

Therefore, it is an objective of the present invention to bring a solution to the issue described above; namely, to provide a key telephone system, a control method, a terminal, and a program with which power consumption can further be reduced.

Solution to Problem

In order to give a solution to the issue described above, a first aspect of a key telephone system according to the present invention is a key telephone system including a terminal and a primary device connected to each other with a wire-line for mutual IP communication, characterized in that; the primary device comprises a transmitting means for transmitting a command for transition into a power-saving state to the terminal, together with a power-saving duration time datum that is a datum showing a power-saving duration time as a time period for continuing the power-saving state, when the time reaches a power-saving state transition time that is a time for transition into the power-saving state which is a state of further reduced power consumption; and the terminal comprises, a communication means for communicating with the primary device, a timekeeper means for measuring a lapse of time specified, and a control means for specifying the power-saving duration time in the timekeeper means, and halting the communication means, at the time of receiving the command for transition into the power-saving state together with the power-saving duration time datum from the primary device, and activating the communication means being halted, at a time when the timekeeper means has measured the lapse of the power-saving duration time.

Then, a first aspect of a control method according to the present invention is a control method of a key telephone system including a terminal and a primary device connected to each other with a wire-line for mutual IP communication, characterized in that the method comprises; a step of transmitting, in the primary device, a command for transition into a power-saving state to the terminal, together with a power-saving duration time datum that is a datum showing a power-saving duration time as a time period for continuing the power-saving state, when the time reaches a power-saving state transition time that is a time for transition into the power-saving state which is a state of further reduced power consumption; a step of specifying the power-saving duration time in the timekeeper means for measuring a lapse of time specified, and halting the communication means for communicating with the primary device, in the terminal, at the time of receiving the command for transition into the power-saving state together with the power-saving duration time datum from the primary device, and a step of activating the communication means being halted, in the terminal, at a time when the timekeeper means has measured the lapse of the power-saving duration time.

Moreover, one aspect of a terminal according to the present invention is a terminal connected with a primary device by way of a wire-line, and included in a key telephone system in which mutual IP communication is carried out between the terminal and the primary device, characterized in that the terminal comprises; a communication means for communicating with the primary device, a timekeeper means for measuring a lapse of time specified, and a control means for specifying a power-saving duration time in the timekeeper means, and halting the communication means, at a time of receiving a command for transition into a power-saving state from the primary device, together with a power-saving duration time datum that is a datum showing the power-saving duration time as a time period for continuing the power-saving state, in which power consumption is further reduced from an operating state, and activating the communication means being halted, at a time when the timekeeper means has measured the lapse of the power-saving duration time.

Then, a second aspect of a control method according to the present invention is a control method of a terminal connected with a primary device by way of a wire-line, and included in a key telephone system in which mutual IP communication is carried out between the terminal and the primary device; the terminal comprising a communication means for communicating with the primary device, and a timekeeper means for measuring a lapse of time specified; characterized in that the control method comprises; a step of specifying a power-saving duration time in the timekeeper means, and halting the communication means, at a time of receiving a command for transition into a power-saving state from the primary device, together with a power-saving duration time datum that is a datum showing the power-saving duration time as a time period for continuing the power-saving state, in which power consumption is further reduced from an operating state, and a step of activating the communication means being halted, at a time when the timekeeper means has measured the lapse of the power-saving duration time.

Moreover, one aspect of a program according to the present invention is a program for a terminal connected with a primary device by way of a wire-line, and included in a key telephone system in which mutual IP communication is carried out between the terminal and the primary device; the terminal comprising a communication means for communicating with the primary device, and a timekeeper means for measuring a lapse of time specified; characterized in that the program comprises; a step of specifying a power-saving duration time in the timekeeper means, and halting the communication means, at a time of receiving a command for transition into a power-saving state from the primary device, together with a power-saving duration time datum that is a datum showing the power-saving duration time as a time period for continuing the power-saving state, in which power consumption is further reduced from an operating state, and a step of activating the communication means being halted, at a time when the timekeeper means has measured the lapse of the power-saving duration time.

A second aspect of a key telephone system according to the present invention is a key telephone system including a terminal and a primary device connected to each other with a wire-line for mutual IP communication, characterized in that; the primary device comprises a transmitting means for transmitting a command for transition into a power-saving state to the terminal, together with a power-saving deactivating time datum that is a datum showing a power-saving deactivating time as a time for transition from the power-saving state into an operating state, when the time reaches a power-saving state transition time that is a time for transition into the power-saving state which is a state of further reduced power consumption; and the terminal comprises, a communication means for communicating with the primary device, a timekeeper means for measuring the time, and a control means for specifying the power-saving deactivating time in the timekeeper means, and halting the communication means, at the time of receiving the command for transition into the power-saving state from the primary device, together with the power-saving deactivating time datum and activating the communication means being halted, at a time when the timekeeper means has measured the power-saving deactivating time.

A third aspect of a key telephone system according to the present invention is a key telephone system including a terminal and a primary device connected to each other with a wire-line for mutual IP communication, characterized in that; the primary device comprises a transmitting means for transmitting a command for transition into a power-saving state to the terminal, together with a power-saving state transition time datum showing the power-saving state transition time that is a time for transition into the power-saving state which is a state of further reduced power consumption, and a power-saving duration time datum that is a datum showing a power-saving duration time as a time period for continuing the power-saving state; and the terminal comprises, a communication means for communicating with the primary device, a timekeeper means for measuring a lapse of time specified and the time, and a control means for specifying the power-saving state transition time and the power-saving duration time in the timekeeper means, at the time of receiving the command for transition into the power-saving state from the primary device, together with the power-saving state transition time datum and the power-saving duration time datum, and halting the communication means, at a time when the timekeeper means has measured the power-saving state transition time, and activating the communication means being halted, at a time when the timekeeper means has measured the lapse of the power-saving duration time after halting the communication means.

A fourth aspect of a key telephone system according to the present invention is a key telephone system including a terminal and a primary device connected to each other with a wire-line for mutual IP communication, characterized in that; the primary device comprises a transmitting means for transmitting a command for transition into a power-saving state to the terminal, together with a power-saving state transition time datum showing the power-saving state transition time that is a time for transition into the power-saving state which is a state of further reduced power consumption, and a power-saving deactivating time datum that is a datum showing a power-saving deactivating time as a time for transition from the power-saving state into an operating state; and the terminal comprises, a communication means for communicating with the primary device, a timekeeper means for measuring the time, and a control means for specifying the power-saving state transition time and the power-saving deactivating time in the timekeeper means, at the time of receiving the command for transition into the power-saving state from the primary device, together with the power-saving state transition time datum and the power-saving deactivating time datum, and halting the communication means, at a time when the timekeeper means has measured the power-saving state transition time, and activating the communication means being halted, at a time when the timekeeper means has measured the power-saving deactivating time.

Advantageous Effects of Invention

According to one aspect as well as a first aspect and a second aspect of the present invention, it is possible to provide a key telephone system, a control method, a terminal, and a program with which power consumption can further be reduced.

DESCRIPTION OF THE PREFERRED EMBODIMENT

{Description of Embodiments}

The key telephone system 11 according to an embodiment of the present invention is explained below with reference to FIG. 1 through FIG. 5.

Figure 1:
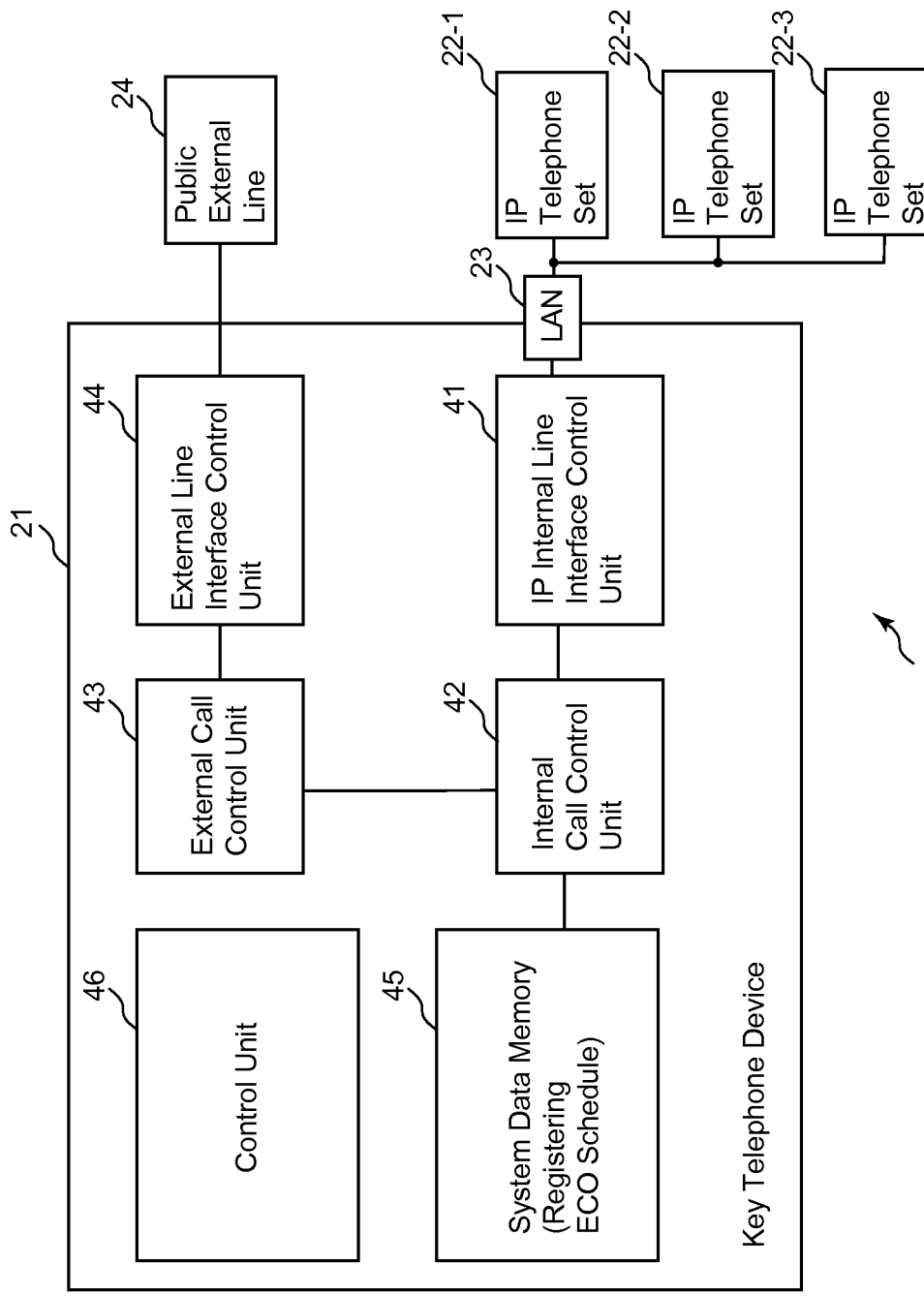
FIG. 1 is a block diagram showing an example of a configuration of a key telephone system 11.

FIG. 1 is a block diagram showing an example of a configuration of the key telephone system 11. The key telephone system 11 includes a key telephone device 21 and IP telephone sets 22-1 through 22-3. In the meantime, the key telephone device 21 and the IP telephone sets 22-1 through 22-3 are connected via a LAN (Local Area Network) 23. The key telephone device 21 is a PBX (Private Branch Exchange) or the like, which is an example of a primary device. The key telephone device 21 makes the IP telephone sets 22-1 through 22-3 ring, in response to a call request from an outside by the intermediary of a public external line 24. On the other hand, if the IP telephone sets 22-1 through 22-3 request a call to an outside, the key telephone device 21 makes a call request by the intermediary of the public external line 24.

The IP telephone sets 22-1 through 22-3 are used by a user, to receive a call request from an outside by the intermediary of the public external line 24, and to request a telephone call to an outside in order to make a telephone call with the outside. In this case, the IP telephone sets 22-1 through 22-3 communicate, by use of TCP/IP (Transmission Control Protocol/Internet Protocol) network, in conformity to VoIP (Voice over Internet Protocol) that is a protocol for transmitting/receiving voice data.

The key telephone device 21 includes; an IP internal line interface control unit 41, an internal call control unit 42, an external call control unit 43, an external line interface control unit 44, a system data memory 45, and a control unit 46. The IP internal line interface control unit 41 controls a communication with the key telephone device 22-1 through 22-3, by the intermediary of the LAN 23. When a call request is made from an outside by the intermediary of the public external line 24, the internal call control unit 42 controls the call request to the IP telephone sets 22-1 through 22-3 by the intermediary of the IP internal line interface control unit 41 and the LAN 23, in response to a request from the external call control unit 43. Moreover, when one of the IP telephone sets 22-1 through 22-3 makes a call request to the other one of the IP telephone sets 22-1 through 22-3, the internal call control unit 42 controls the call request to the other one of the IP telephone sets 22-1 through 22-3 by the intermediary of the IP internal line interface control unit 41 and the LAN 23. Furthermore, when the IP telephone sets 22-1 through 22-3 make a call request to an outside, the internal call control unit 42 demands that the external call control unit 43 makes the call request to the outside.

When the IP telephone sets 22-1 through 22-3 make a call request to an outside, the external call control unit 43 controls the call request by the intermediary of the external line interface control unit 44 and the public external line 24, in response to the demand from the internal call control unit 42. Meanwhile, when a call request is made from an outside to the IP telephone sets 22-1 through 22-3 by the intermediary of the external line interface control unit 44 and the public external line 24, the external call control unit 43 demands that the internal call control unit 42 makes the call request to the IP telephone sets 22-1 through 22-3.

The system data memory 45 includes a semiconductor memory, a hard disc drive, or a memory card and the like; in order to store (register) a control program to be executed by the control unit 46, data required for various controls, an ECO schedule showing a schedule of transition into an ECO mode, and the like. Including a dedicated or programmable IC (Integrated Circuit), or an MPU (Micro Processing Unit) for executing a control program, and the like; the control unit 46 controls each part of the key telephone device 21. Moreover, the control unit 46 makes up a transition of a state of the key telephone system 11 into, either an ECO mode that is a state of further reduced power consumption, or a stand-by state. Incidentally, the ECO mode is an example of a power-saving state that is a state of further reduced power consumption; and on the other hand, the stand-by state is an example of a state in operation. At the time of making up a transition of the state of the key telephone system 11 into the ECO mode, the control unit 46 controls the IP internal line interface control unit 41 in such a way as to transmit a command for transition into the ECO mode, to the IP telephone sets 22-1 through 22-3, by the intermediary of the LAN 23.

In the following descriptions; as far as there exists no necessity to individually identify the IP telephone sets 22-1 through 22-3, an IP telephone set is just called an IP telephone set 22.

In the following descriptions; an explanation is made with a case where the control unit 46 executes a control program, stored in the system data memory 45, in order to control each part of the key telephone device 21.

Figure 2:
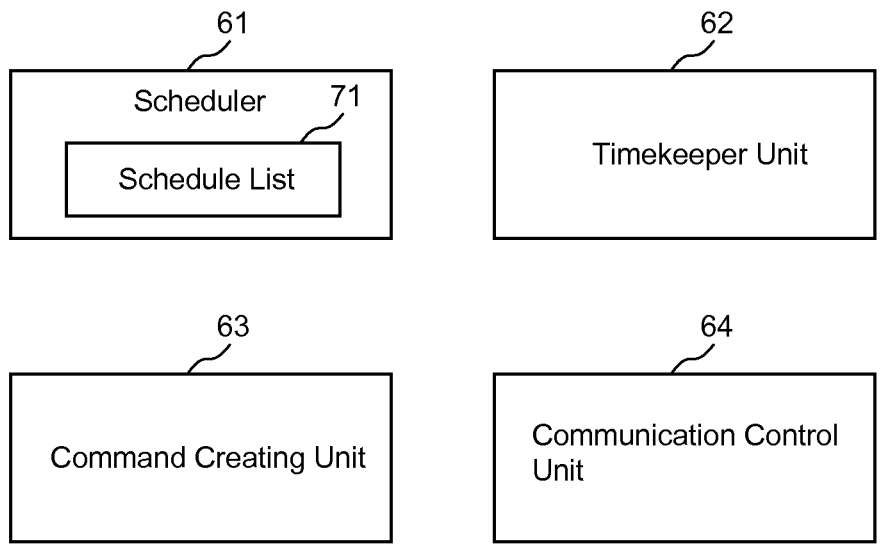
FIG. 2 is a block diagram showing a configuration of a function materialized by a control unit 46 to execute a control program.

FIG. 2 is a block diagram showing a configuration of a function materialized by the control unit 46 to execute the control program. A scheduler 61, a timekeeper unit 62, a command creating unit 63, and a communication control unit 64 are materialized by the control unit 46 that executes the control program. The scheduler 61 gives a command for transition into, either the ECO mode or the stand-by state, at a predetermined time, on the basis of an ECO schedule that is stored as a schedule list 71. Incidentally, an ECO mode activating time and an ECO mode deactivating time are described in the schedule list 71. The ECO mode activating time is a time for transition into the ECO mode. Meanwhile, the ECO mode deactivating time is a time for transition from the ECO mode into the stand-by state. An ECO mode is a state of further reduced power consumption in comparison with a power consumption in a stand-by state.

For example, "18:00" as an ECO mode activating time and "07:00" as an ECO mode deactivating time are described in the schedule list 71. An explanation is made below, by using a case example where "18:00" as an ECO mode activating time and "07:00" as an ECO mode deactivating time are described in the schedule list 71.

The timekeeper unit 62 is a clock, as it is called, to output a present time. The scheduler 61 obtains the present time from the timekeeper unit 62, and compares the ECO mode activating time of the schedule list 71 with the present time. When the present time has reached the ECO mode activating time, the scheduler 61 notifies the command creating unit 63 that the present time has reached the ECO mode activating time. At the time of being notified that the present time has reached the ECO mode activating time, the command creating unit 63 creates an ECO mode command to be transmitted to the IP telephone set 22. The ECO mode command includes a command for ECO activation; namely, a command for transition into the ECO mode; and an ECO mode duration time datum that is a datum showing an ECO mode duration time as a time period for continuing the ECO mode. In this case, the ECO mode duration time is dealt with as 13 hours; namely, from "18:00" as the ECO mode activating time until "07:00" as the ECO mode deactivating time. Then, the ECO mode duration time datum shows 13 hours as the ECO mode duration time.

The command creating unit 63 supplies the created ECO mode command to the communication control unit 64. Then, the communication control unit 64 controls the IP internal line interface control unit 41 so as to have the ECO mode command transmitted to the IP telephone set 22 by the intermediary of the LAN 23.

Figure 3:
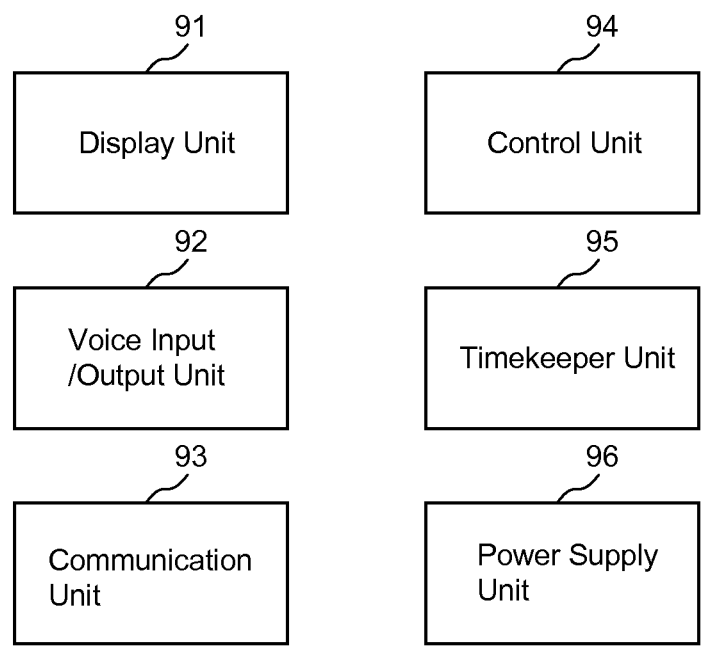
FIG. 3 is a block diagram showing an example of a configuration of an IP telephone set 22.

Next, a configuration of the IP telephone set 22 is explained. FIG. 3 is a block diagram showing an example of a configuration of the IP telephone set 22. The IP telephone set 22 includes a display unit 91, a voice input/output unit 92, a communication unit 93, a control unit 94, a timekeeper unit 95, and a power supply unit 96. The display unit 91 includes an LCD, an organic EL (electro-luminescence) display, and the like; and displays various information such as a telephone number under control of the control unit 94. The voice I/O unit 92 includes a microphone, and a loudspeaker; and obtains voice of a user who is a caller calling at the time, and outputs voice of a calling counterpart. The communication unit 93 communicates a call request signal, a voice signal of a telephone call, and the like with the key telephone device 21 by the intermediary of the LAN 23. Moreover, the communication unit 93 receives a signal for various controls, transmitted from the key telephone device 21, by the intermediary of the LAN 23. For example, the communication unit 93 receives an ECO mode command transmitted from the key telephone device 21. In the meantime, the communication unit 93 transmits a signal for various controls to the key telephone device 21, by the intermediary of the LAN 23. For example, the communication unit 93 transmits a signal for notifying a state of the IP telephone set 22 to the key telephone device 21.

Including a dedicated or programmable IC, or an MPU for executing a control program, and the like; the control unit 94 controls each part of the IP telephone set 22. The timekeeper unit 95 is a timer, as it is called, to measure a lapse of time specified. When the specified time has passed, the timekeeper unit 95 notifies the control unit 94, by way of interrupt, that the specified time has passed.

At a time of having received an ECO mode command from the key telephone device 21, the control unit 94 sets an ECO mode duration time in the timekeeper unit 95. Moreover, at the time of having received an ECO mode command from the key telephone device 21, the control unit 94 halts the communication unit 93. Furthermore, at the time of having received an ECO mode command from the key telephone device 21, the control unit 94 halts the display unit 91 and the voice input/output unit 92. Incidentally, the timekeeper unit 95 measures a lapse of time even when the display unit 91, the voice input/output unit 92, and the communication unit 93 are halted.

At the time of having received a notice from the timekeeper unit 95, by way of interrupt, that the ECO mode duration time has passed, the control unit 94 activates the communication unit 93 being in a halt state at the time. Moreover, at the time of having received a notice from the timekeeper unit 95, by way of interrupt, that the ECO mode duration time has passed, the control unit 94 activates the display unit 91 and the voice input/output unit 92 that are in a power-saving state at the time.

The power supply unit 96 supplies the display unit 91 through the timekeeper unit 95 with power required. The power supply unit 96 supplies the display unit 91 through the timekeeper unit 95 with power, even when the display unit 91, the voice input/output unit 92, and the communication unit 93 are halted.

Figure 4:
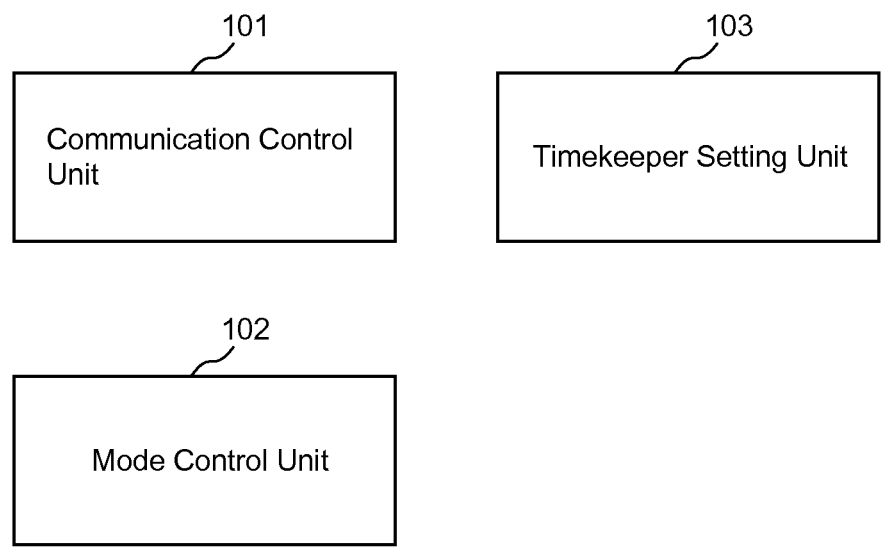
FIG. 4 is a block diagram showing a configuration of a function materialized by a control unit 94 to execute a control program.

In the following descriptions; an explanation is made by using a case example where the control unit 94 executes a control program, in order to control each part of the IP telephone set 22. FIG. 4 is a block diagram showing a configuration of a function materialized by the control unit 94 that executes a control program. A communication control unit 101, a mode control unit 102, and a timekeeper setting unit 103 are materialized by the control unit 94 that executes a control program. The communication control unit 101 makes the communication unit 93 receive a signal for various controls, transmitted from the key telephone device 21, by the intermediary of the LAN 23. Moreover, the communication control unit 101 makes the communication unit 93 transmit a signal for various controls to the key telephone device 21, by the intermediary of the LAN 23.

The mode control unit 102 makes up a transition of a state of the IP telephone set 22 into the ECO mode, the stand-by state, or the like. At a time of making up a transition from the stand-by state into the ECO mode, the mode control unit 102 halts the display unit 91, the voice input/output unit 92 and the communication unit 93. At a time of making up a transition from the ECO mode into the stand-by state, the mode control unit 102 activates the display unit 91, the voice input/output unit 92 and the communication unit 93. The timekeeper setting unit 103 sets up a time datum such as an ECO mode duration time, in the timekeeper unit 95.

Figure 5:
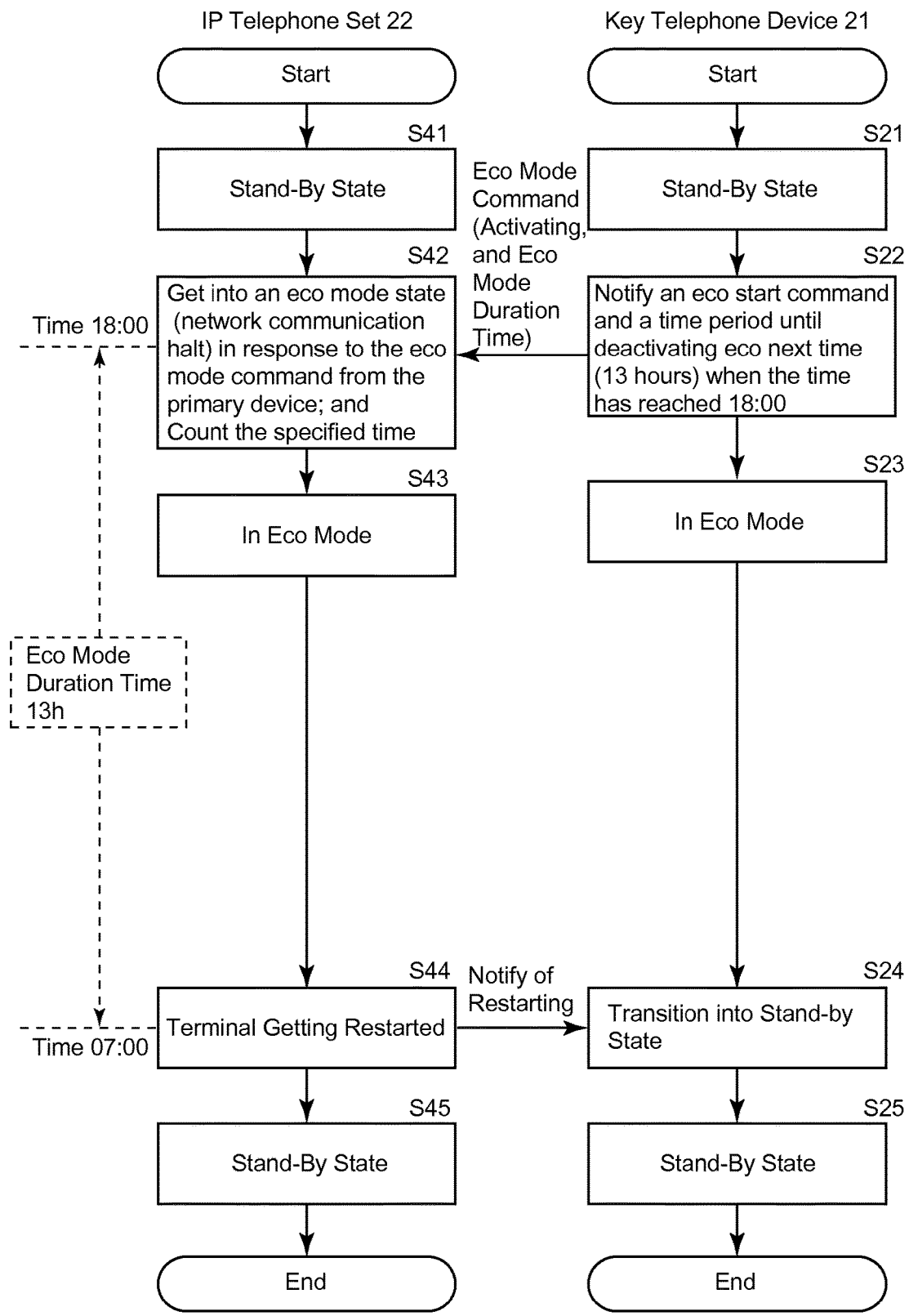
FIG. 5 is a flowchart for explaining a control for putting the key telephone system 11 into a power-saving state.

Next, a control for putting the key telephone system 11 into a power-saving state is explained with reference to the flowchart shown in FIG. 5. At Step S21, the key telephone device 21 is in the stand-by state. At Step S41, the IP telephone set 22 is in the stand-by state. If the time reaches "18:00," the key telephone device 21 notifies the IP telephone set 22, at Step S22, of a command for ECO activation and a time period until deactivating ECO next time (13 hours).

In other words, the scheduler 61 obtains the present time from the timekeeper unit 62, and compares an ECO mode activating time described in an ECO schedule that is stored as the schedule list 71 with the present time. When the present time has reached "18:00" as the ECO mode activating time, the scheduler 61 notifies the command creating unit 63 that the present time has reached the ECO mode activating time. At the time of being notified that the present time has reached the ECO mode activating time, the command creating unit 63 creates an ECO mode command to be transmitted to the IP telephone set 22. The ECO mode command includes a command for ECO activation; namely, a command for transition into the ECO mode; and an ECO mode duration time datum that is a datum showing an ECO mode duration time, being 13 hours. The command creating unit 63 supplies the created ECO mode command to the communication control unit 64. Then, the communication control unit 64 controls the IP internal line interface control unit 41 so as to have the ECO mode command transmitted to the IP telephone set 22 by the intermediary of the LAN 23.

The ECO mode command is transmitted in this way, from the key telephone device 21 to the IP telephone set 22. The ECO mode command includes the command for ECO activation, and the ECO mode duration time datum.

At Step S23, the key telephone device 21 gets into the ECO mode.

At Step S42, the IP telephone set 22 gets into an ECO mode state (in which the network communication is halted), in response to the ECO mode command from the primary device; and then counts the specified time. In other words, the communication control unit 101 makes the communication unit 93 receive the ECO mode command transmitted from the key telephone device 21 by the intermediary of the LAN 23. The communication control unit 101 supplies the ECO mode command received, to the mode control unit 102 and the timekeeper setting unit 103. Then, the timekeeper setting unit 103 sets up the ECO mode duration time, being 13 hours, shown by the ECO mode duration time datum included in the ECO mode command, in the timekeeper unit 95. Having received the ECO mode command, the mode control unit 102 makes up a transition of a state of the IP telephone set 22 into the ECO mode. In other words, the mode control unit 102 halts the display unit 91, the voice input/output unit 92, and the communication unit 93. In this way, the IP telephone set 22 gets into the ECO mode at Step S43. In the IP telephone set 22 that is in the ECO mode, communication with the key telephone device 21 is halted, so that a reduced amount of power consumption becomes further great.

Incidentally, when the IP telephone set 22 is in the ECO mode, the control unit 94 may be placed into a sleeping state.

When the time reaches "07:00," a transition is made up at Step S24 for the key telephone device 21 to get into the stand-by state.

When the time reaches "07:00," the IP telephone set 22 gets restarted at Step S44, in order to make a comeback. In other words, when the time reaches "07:00," the ECO mode duration time, being 13 hours, has elapsed, and then the timekeeper unit 95 notifies the control unit 94 by way of interrupt that the ECO mode duration time has elapsed. When the control unit 94 receives a notice from the timekeeper unit 95, by way of interrupt, that the ECO mode duration time has elapsed, the mode control unit 102 makes up a transition of a state of the IP telephone set 22 from the ECO mode into the stand-by state. In other words, the mode control unit 102 activates the display unit 91, the voice input/output unit 92 and the communication unit 93, in order to put them into the stand-by state. Then, the communication control unit 101 makes the communication unit 93 notify the key telephone device 21, by the intermediary of the LAN 23, that the IP telephone set 22 has restarted.

In this way, the IP telephone set 22 gets into the stand-by state at Step S45. The stand-by state is one of normal operation states. Moreover, at Step S25, the key telephone device 21 gets into the stand-by state so that the key telephone system 11 becomes operational, and a control for having the key telephone system 11 in the power-saving state finishes.

Thus, the ECO mode continues for 13 hours, from "18:00" that is the ECO mode activating time, until "07:00" that is the ECO mode deactivating time, as described in the ECO schedule. In the ECO mode; the display unit 91, the voice input/output unit 92, and the communication unit 93, which are included in the IP telephone set 22, are halted. In the ECO mode, power consumption of the IP telephone set 22, which is not used at the time, can further be cut down. Then, the power consumption can further be reduced.

Incidentally; although a case where the IP telephone sets 22-1 through 22-3 are provided, is explained above as an example, a configuration is not limited to the case, and the number of the telephone sets included in the IP telephone set 22 can be arbitrary.

Moreover; although an explanation is made in such a way that the communication unit 93 is halted in the ECO mode, what is required is that the communication is actually halted. Halting the communication unit 93 also includes, for example, turning off the power of the communication unit 93, and putting the communication unit 93 into a sleep state by stopping the clock.

Incidentally; although an explanation is made in such a way that the ECO mode command includes a command for ECO activation, and an ECO mode duration time datum, the ECO mode command may include a command for ECO activation, a datum indicating an ECO mode activating time, and a datum indicating an ECO mode deactivating time. In another case example, the ECO mode command may include a command for ECO activation, and a datum indicating an ECO mode deactivating time. In this case, the timekeeper unit 95 is a so-called clock, and an ECO mode deactivating time is set up; and when the time has reached the ECO mode deactivating time, the control unit 94 is notified, by way of interrupt, that the time has reached the ECO mode deactivating time. When the control unit 94 receives a notice that the time has reached the ECO mode deactivating time, from the timekeeper unit 95 by way of interrupt, the mode control unit 102 makes up a transition of a state of the IP telephone set 22 from the ECO mode into the stand-by state.

Moreover, the ECO mode command may include a command for ECO activation, a datum indicating an ECO mode activating time, and an ECO mode duration time datum; in such a way that the communication control unit 64 controls the IP internal line interface control unit 41, before the ECO mode activating time, in order to transmit the ECO mode command to the IP telephone set 22, by the intermediary of the LAN 23. In other words, the communication control unit 64 may control the IP internal line interface control unit 41 in advance, so as to transmit the ECO mode command including a command for ECO activation, a datum indicating an ECO mode activating time, and an ECO mode duration time datum, to the IP telephone set 22, by the intermediary of the LAN 23. In this case, when the time has reached the ECO mode activating time, the timekeeper unit 95 notifies the control unit 94, by way of interrupt, that the time has reached the ECO mode activating time. Meanwhile, when the control unit 94 receives a notice that the time has reached the ECO mode activating time, from the timekeeper unit 95 by way of interrupt, the mode control unit 102 makes up a transition of a state of the IP telephone set 22 from the stand-by state into the ECO mode.

Still further, the ECO mode command may include a command for ECO activation, a datum indicating an ECO mode activating time, and a datum indicating the ECO mode deactivating time; in such a way that the communication control unit 64 controls the IP internal line interface control unit 41, before the ECO mode activating time, in order to transmit the ECO mode command to the IP telephone set 22, by the intermediary of the LAN 23. In other words, the communication control unit 64 may control the IP internal line interface control unit 41 in advance, so as to transmit the ECO mode command including a command for ECO activation, a datum indicating an ECO mode activating time, and a datum indicating the ECO mode deactivating time, to the IP telephone set 22, by the intermediary of the LAN 23. In this case, when the time has reached the ECO mode activating time, the timekeeper unit 95 notifies the control unit 94, by way of interrupt, that the time has reached the ECO mode activating time. Meanwhile, when the control unit 94 receives a notice that the time has reached the ECO mode activating time, from the timekeeper unit 95 by way of interrupt, the mode control unit 102 makes up a transition of a state of the IP telephone set 22 from the stand-by state into the ECO mode. In the meantime, when the time has reached the ECO mode deactivating time, the timekeeper unit 95 notifies the control unit 94, by way of interrupt, that the time has reached the ECO mode deactivating time. Meanwhile, when the control unit 94 receives a notice that the time has reached the ECO mode deactivating time, from the timekeeper unit 95 by way of interrupt, the mode control unit 102 makes up a transition of a state of the IP telephone set 22 from the ECO mode into the stand-by state.

As described above, the key telephone system 11 as an example of a key telephone system includes the IP telephone set 22 as an example of a terminal, and the key telephone device 21 as an example of a primary device. The key telephone device 21 includes the IP internal line interface control unit 41 as an example of a transmitting means for transmitting a command for transition into a power-saving state to a terminal, together with a power-saving duration time datum that is a datum showing a power-saving duration time as a time period for continuing the power-saving state, when the time reaches a power-saving state transition time that is a time for transition into the power-saving state which is a state of further reduced power consumption. Then, the IP telephone set 22 includes: the communication unit 93 as an example of a communication means for communicating with the primary device; the timekeeper unit 95 as an example of a timekeeper means for measuring a lapse of time specified; and the control unit 94 as an example of a control means for specifying the power-saving duration time in the timekeeper means, and halting the communication means, at the time of receiving the command for transition into the power-saving state together with the power-saving duration time datum from the primary device, and activating the communication means being halted, at a time when the timekeeper means has measured the lapse of the power-saving duration time. The ECO mode is an example of the power-saving state. The ECO mode activating time is an example of the power-saving state transition time. The ECO mode duration time is an example of the power-saving duration time. The ECO mode duration time datum is an example of the power-saving duration time datum. The ECO mode command is an example of the command for transition into the power-saving state.

Moreover, the key telephone device 21 further includes the system data memory 45 as an example of a storage means for storing the power-saving state transition time and the activating time that is a time for transition from the power-saving state into an operating state; and the transmitting means transmits the command for transition into the power-saving state to a terminal, together with the power-saving duration time datum that is a datum showing the power-saving duration time from the power-saving state transition time until the activating time, when the time reaches the power-saving state transition time. The ECO mode deactivating time is an example of the activating time.

Moreover, the key telephone device 21 includes the IP internal line interface control unit 41 as an example of a transmitting means for transmitting a command for transition into a power-saving state to a terminal, together with a power-saving deactivating time datum that is a datum showing a power-saving deactivating time as a time for transition from the power-saving state into the operating state, when the time reaches a power-saving state transition time that is a time for transition into the power-saving state which is a state of further reduced power consumption. Then, the IP telephone set 22 includes: the communication unit 93 as an example of a communication means for communicating with the primary device; the timekeeper unit 95 as an example of a time keeper means for measuring the time; and the control unit 94 as an example of a control means for specifying the power-saving deactivating time in the timekeeper means, and halting the communication means, at the time of receiving the command for transition into the power-saving state together with the power-saving deactivating time datum from the primary device, and activating the communication means being halted, at a time when the timekeeper means has measured the power-saving deactivating time.

Furthermore, the key telephone device 21 includes the IP internal line interface control unit 41 as an example of a transmitting means for transmitting a command for transition into a power-saving state to a terminal, together with a power-saving state transition time datum showing the power-saving state transition time that is a time for transition into the power-saving state which is a state of further reduced power consumption, and a power-saving duration time datum that is a datum showing a power-saving duration time as a time period for continuing the power-saving state. Then, the IP telephone set 22 includes: the communication unit 93 as an example of a communication means for communicating with the primary device; the timekeeper unit 95 as an example of a timekeeper means for measuring a lapse of time specified and the time; and the control unit 94 as an example of a control means for specifying the power-saving state transition time and the power-saving duration time in the timekeeper means, at the time of receiving the command for transition into the power-saving state from the primary device, together with the power-saving state transition time datum and the power-saving duration time datum, and halting the communication means, at a time when the timekeeper means has measured the power-saving state transition time, and activating the communication means being halted, at a time when the timekeeper means has measured the lapse of the power-saving duration time after halting the communication means.

Moreover, the key telephone device 21 includes the IP internal line interface control unit 41 as an example of a transmitting means for transmitting a command for transition into a power-saving state to a terminal, together with a power-saving state transition time datum showing the power-saving state transition time that is a time for transition into the power-saving state which is a state of further reduced power consumption, and a power-saving deactivating time datum that is a datum showing a power-saving deactivating time as a time for transition from the power-saving state into the operating state. Then, the IP telephone set 22 includes: the communication unit 93 as an example of a communication means for communicating with the primary device; the timekeeper unit 95 as an example of a time keeper means for measuring the time; and the control unit 94 as an example of a control means for specifying the power-saving state transition time and the power-saving deactivating time in the timekeeper means, at the time of receiving the command for transition into the power-saving state from the primary device, together with the power-saving state transition time datum and the power-saving deactivating time datum, and halting the communication means, at a time when the timekeeper means has measured the power-saving state transition time, and activating the communication means being halted, at a time when the timekeeper means has measured the power-saving deactivating time.

The series of processes described above may be executed by means of hardware, and may as well be executed by way of software. For executing the series of processes by way of software, a program constituting the software is installed from a program recording medium into a computer built in exclusive-use hardware, or for example, a general-purpose personal computer that can execute various functions with various programs being installed.

Incidentally, the program to be executed by the computer may be a program with which processes are carried out in chronological order along the sequence explained in this specification document, or may be a program with which processes are carried out in parallel or at the time as required, such as, in response to a call.

Furthermore, an embodiment of the present invention is not limited to only the embodiment described above, and various other variations may be made without departing from the concept of the present invention.

REFERENCE SIGNS LIST 11. key telephone system (key telephone system)
21. key telephone device (primary device)
22, and 22-1 through 22-3. IP telephone set (terminal)
23. LAN
24. public external line
41. IP internal line interface control unit (transmitting means)
42. internal call control unit
43. external call control unit
44. external line interface control unit
45. system data memory (storage means)
46. control unit
61. scheduler
62. timekeeper unit
63. command creating unit
64. communication control unit
71. schedule list
91. display unit
92. voice input/output unit
93. communication unit (communication means)
94. control unit (control means)
95. timekeeper unit (timekeeper means)
96. power supply unit
101. communication control unit
102. mode control unit
103. timekeeper setting unit

The invention claimed is:

1. A key telephone system comprising a terminal and a primary device connected to each other with a wire-line for mutual IP communication, wherein;
the primary device comprises a transmitter configured to transmit a command for transition into a power-saving state to the terminal, together with a power-saving duration time datum that is a datum showing a power-saving duration time as a time period for continuing the power-saving state and/or a power-saving deactivating time datum that is a datum showing a power-saving deactivating time as a time for transition from the power-saving state into an operating state, when the time reaches a power-saving state transition time that is a time for transition into the power-saving state which is a state of further reduced power consumption; and
the terminal comprising at least one hardware processor configured to implement:
a communicator configured to communicate with the primary device,
a timekeeper configured to measure a lapse of time specified and/or measuring the time, and
a controller configured to specify the power-saving duration time and/or the power-saving deactivating time in the timekeeper, and halting the communicator, at the time of receiving the command for transition into the power-saving state together with the power-saving duration time datum and/or the power-saving deactivating time datum from the primary device, and activating the communicator being halted, at a time when the timekeeper has measured the lapse of the power-saving duration time and/or the power-saving deactivating time, wherein
the terminal is an internet protocol(IP) telephone set;
the power saving state includes halting the terminal's communicator, display and voice input/output unit, wherein halting the communicator includes turning off power to the communicator;
at the time that the power-saving duration has passed or the power-saving deactivation time is reached, the timekeeper notifies, via an interrupt, the controller that the power-saving duration time and/or the power-saving deactivating time has been reached; and
in response to the interrupt, the controller activates the communicator, the display, and the voice input/output unit.

2. The key telephone system according to claim 1;
wherein the primary device further includes a storage device configured to store the power-saving state transition time and an activating time that is a time for transition from the power-saving state into an operating state; and
the transmitter transmits the command for transition into the power-saving state to the terminal, together with the power-saving duration time datum that is a datum showing the power-saving duration time from the power-saving state transition time until the activating time, when the time reaches the power-saving state transition time.

3. A control method of a key telephone system including a terminal and a primary device connected to each other with a wire-line for mutual IP communication, wherein the method comprises;
transmitting, in the primary device, a command for transition into a power-saving state to the terminal, together with a power-saving duration time datum that is a datum showing a power-saving duration time as a time period for continuing the power-saving state and/or a power-saving deactivating time datum that is a datum showing a power-saving deactivating time as a time for transition from the power-saving state into an operating state, when the time reaches a power-saving state transition time that is a time for transition into the power-saving state which is a state of further reduced power consumption;
specifying the power-saving duration time and/or the power-saving deactivating time in a timekeeper for measuring a lapse of time specified and/or measuring the time, and halting a communicator configured to communicate with the primary device, in the terminal, at the time of receiving the command for transition into the power-saving state together with the power-saving duration time datum and/or the power-saving deactivating time datum from the primary device, and
activating the communicator being halted, in the terminal, at a time when the timekeeper has measured the lapse of the power-saving duration time and/or the power-saving deactivating time, wherein
the terminal is an internet protocol(IP) telephone set;
the power saving state includes halting the terminal's communicator, display and voice input/output unit, wherein halting the communicator includes turning off power to the communicator;
at the time that the power-saving duration has passed or the power-saving deactivation time is reached, the timekeeper notifies, via an interrupt, the controller that the power-saving duration time and/or the power-saving deactivating time has been reached; and in response to the interrupt, the controller activates the communicator, the display, and the voice input/output unit.

4. A terminal connected with a primary device by way of a wire-line, and included in a key telephone system in which mutual IP communication is carried out between the terminal and the primary device, wherein the terminal comprises:
   a memory storing instructions; and
   at least one hardware processor configured to execute the instructions to implement:
      a communicator configured to communicate with the primary device,
      a timekeeper configured to measure a lapse of time specified and/or measuring the time, and
      a controller configured to specify a power-saving duration time and/or a power-saving deactivating time in the timekeeper, and halting the communicator, at a time of receiving a command for transition into a power-saving state from the primary device, together with a power-saving duration time datum that is a datum showing the power-saving duration time as a time period for continuing the power-saving state and/or a power-saving deactivating time datum that is a datum showing a power-saving deactivating time as a time for transition from the power-saving state into an operating state, in which power consumption is further reduced from an operating state, and activating the communicator being halted, at a time when the timekeeper has measured the lapse of the power-saving duration time and/or the power-saving deactivating time, wherein
   the terminal is an internet protocol(IP) telephone set;
   the power saving state includes halting the terminal's communicator, display and voice input/output unit, wherein halting the communicator includes turning off power to the communicator;
   at the time that the power-saving duration has passed or the power-saving deactivation time is reached, the timekeeper notifies, via an interrupt, the controller that the power-saving duration time and/or the power-saving deactivating time has been reached; and
   in response to the interrupt, the controller activates the communicator, the display, and the voice input/output unit.

5. A control method of a terminal connected with a primary device by way of a wire-line, and included in a key telephone system in which mutual IP communication is carried out between the terminal and the primary device; the terminal comprising a communicator configured to communicate with the primary device, and a timekeeper configured to measure a lapse of time specified; wherein the control method comprises;
   specifying a power-saving duration time and/or a power-saving deactivating time in the timekeeper, and halting the communicator, at a time of receiving a command for transition into a power-saving state from the primary device, together with a power-saving duration time datum that is a datum showing the power-saving duration time as a time period for continuing the power-saving state and/or a power-saving deactivating time datum that is a datum showing a power-saving deactivating time as a time for transition from the power-saving state into an operating state, in which power consumption is further reduced from an operating state, and
   activating the communicator being halted, at a time when the timekeeper has measured the lapse of the power-saving duration time and/or the power-saving deactivating time, wherein
      the terminal is an internet protocol(IP) telephone set;
      the power saving state includes halting the terminal's communicator, display and voice input/output unit, wherein halting the communicator includes turning off power to the communicator;
      at the time that the power-saving duration has passed or the power-saving deactivation time is reached, the timekeeper notifies, via an interrupt, the controller that the power-saving duration time and/or the power-saving deactivating time has been reached; and
      in response to the interrupt, the controller activates the communicator, the display, and the voice input/output unit.

* * * * *